Patented Oct. 30, 1923.

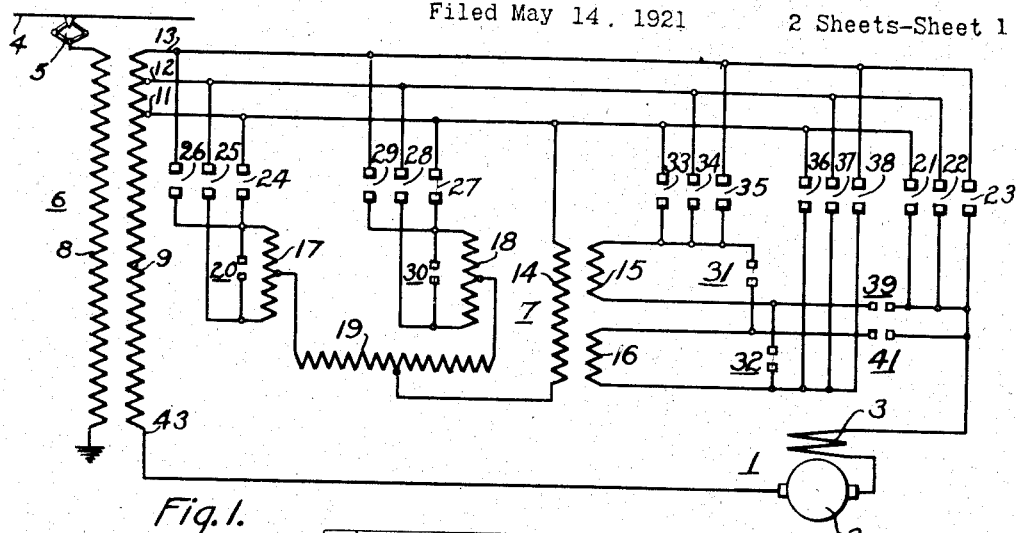

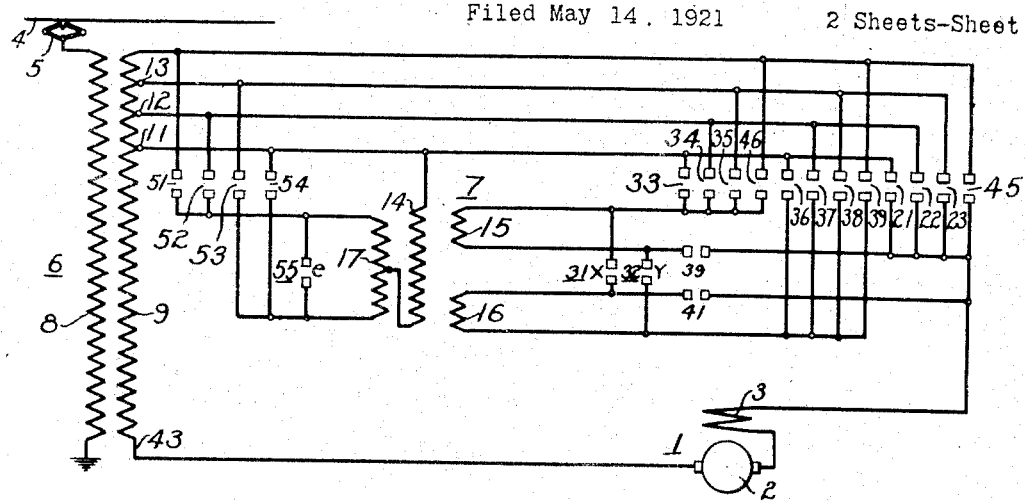

1,472,161

UNITED STATES PATENT OFFICE.

CHARLES LE G. FORTESCUE, OF PITTSBURGH, AND LLOYD J. HIBBARD, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

Application filed May 14, 1921. Serial No. 469,563.

*To all whom it may concern:*

Be it known that we, CHARLES LE G. FORTESCUE, a subject of the King of Great Britain, and a resident of Pittsburgh, in the county of Allegheny and State of Pennsylvania, and LLOYD J. HIBBARD, a citizen of the United States, and a resident of Wilkinsburg, in the county of Allegheny and State of Pennsylvania, have invented a new and useful Improvement in Systems of Control, of which the following is a specification.

Our invention relates to motor-control systems and it has particular relation to control systems for governing the operation of motors that are employed to drive railway vehicles.

The object of our invention is to provide an improved system of control for so governing the acceleration of railway motors that but little arcing occurs upon the opening of a plurality of switches during acceleration because the circuits that are interrupted thereby carry relatively small currents at the instant of interruption.

Another object of our invention is to reduce the number of switches that have heretofore been required to effect a predetermined number of steps during acceleration of a motor.

Briefly speaking, our invention consists in providing an auxiliary transformer having a plurality of secondary windings for effecting step-by-step variations in voltage between successive taps of a main transformer and upon changing the connection of the secondary windings of the auxiliary transformer from one of the taps of the main transformer to another one of the secondary windings is connected in series relation with the adjacent tap prior to the disconnection of the other winding from the circuit in which it has been employed. By this manner of acceleration, there is no interval during which the motor is disconnected from the main transformer and there is no momentary loss in voltage across the main motors while the auxiliary transformer is being reversed.

Our invention also consists in employing preventive coils to effect step-by-step variation in the voltage of one of the windings of the auxiliary transformer, thereby reducing the number of main transformer taps.

For a better understanding of our invention, reference may be made to the accompanying drawing, Figure 1 of which is a schematic diagram of the main circuits of a control system employed to govern a motor, in accordance with our invention;

Fig. 2 is a chart showing the sequence of operation of a plurality of switches employed to govern the control system shown in Fig. 1;

Fig. 3 is a diagrammatic view of a modified form of control system embodying our invention; and Fig. 4 is a sequence chart showing the order in which a plurality of switches that are shown in Fig. 3 are closed.

Referring particularly to Fig. 1, a motor 1 having an armature 2 and a series field-magnet winding 3 is energized from a trolley 4 through a pantograph 5, a main transformer 6 and an auxiliary transformer 7.

The main transformer 6 has a primary winding 8 and a secondary winding 9, which has a plurality of taps 11, 12 and 13. The auxiliary transformer 7 has a primary winding 14 and a plurality of secondary windings 15 and 16.

The primary winding 14 of the auxiliary transformer 7 is energized by being adjustably connected to the taps 11, 12 and 13 of the secondary winding 9 of the main transformer 6, and a plurality of preventive coils 17, 18 and 19 are employed to prevent excessive current traversing the primary winding 14 of the auxiliary transformer 7 and to increase the number of accelerating steps.

The motor 1 may be connected directly to the taps 11, 12 and 13 by a plurality of switches 21, 22 and 23, respectively. The energization of the primary winding 14 of the auxiliary transformer 7 may be varied by means of a plurality of switches 24 to 29, inclusive. The switches 24, 25 and 26 are adapted to connect the preventive coil 17 to the taps 11, 12 and 13, respectively, of the secondary winding 9 of the main transformer 6, and the preventive coil 18 may be likewise connected to the taps 11, 12 and 13 by means of switches 27, 28 and 29, respectively. Portions of the preventive coils 17 and 18 may be connected in parallel relation by means of switches 20 and 30, respectively.

The transformer 7 may have its secondary windings 15 and 16 connected in parallel relation, the one to the other by means of a plurality of switches 31 and 32. One terminal of the secondary winding 15 of the auxiliary transformer 7 may be connected to the taps 11, 12 and 13 of the secondary winding 9 of the main transformer 6 by switches 33, 34 and 35, respectively.

One terminal of the secondary winding 16 of the auxiliary transformer 7 may be connected to the taps 11, 12 and 13 of the secondary winding 9 of the main transformer 6 by means of switches 36, 37 and 38, respectively. The secondary windings 15 and 16 of the auxiliary transformer 7 may be connected in series relation with the motor 1 by means of switches 39 and 41.

For the sake of simplicity, the auxiliary control circuits for governing the operation of the contactors that are employed to govern the main circuits of the control system have been omitted, though they may be supplied readily by anyone skilled in the art.

If, instead of employing magnetically operated contactors or switches, a drum type controller is employed the same sequence of operation of the switches may be as readily effected. There will be relatively slight arcing upon the interruption of the main circuits of the control system because of the sequence of operation of the contactors or switches and the novel arrangement of the main circuits. It is, therefore, considered to be one of the chief advantages of the present invention that a drum controller may be employed to govern a control system designed in accordance with our invention.

The operation of the control system that is illustrated in Fig. 1 is begun by closing the contactors 29, 26, 30, 20, 33, 39, 31 and 32, in acordance with step 1 of the sequence chart shown in Fig. 2, thereby establishing a circuit from tap 11 of the secondary winding 9 of the main transformer 6 through contactor 33, parallel-connected secondary windings 15 and 16 of the auxiliary transformer 7, contactors 31, 32 and 39, series field-magnet winding 3 and armature 2 of the motor 1 to the terminal 43 of the secondary winding 9 of the main transformer 6.

The transformer 7 is so designed, that, when the primary winding 14 of the auxiliary transformer 7 is connected across the taps 11 and 13 of the secondary winding 9 of the main transformer 6 by the closure of the contactors 26, 29, 20 and 30, the voltage across the terminals of the secondary windings 15 and 16 of the auxiliary transformer 7 is equal to one-half the voltage between successive taps of the main transformer 6. The current induced in the secondary windings 15 and 16 of the auxiliary transformer 7 by the primary winding 14, when the contactors 26, 29, 20, 30, 31, 32, 33 and 39 are closed, reduces the voltage that is applied across the terminals of the motor 1 by one-half the voltage between adjacent taps of the main transformer 6. When the above-mentioned contactors are closed, the voltage across the terminals of the motor 1 is equal to the voltage between the taps 11 and 43 of the secondary winding 9 of the main transformer 6 minus one-half the difference in voltage between the taps 11 and 12 of the secondary winding 9 of the main transformer 6.

The voltage across the terminals of the motor 1 may be gradually increased by decreasing the voltage across the terminals of the primary winding 14 of the auxiliary transformer 7. This result is accomplished by the closure of the switches 25, 26, 28 and 29 in conjunction with the operation of the contactors 20 and 30, as set forth in steps 2 to 9, inclusive, of the sequence chart shown in Fig. 2.

When the switches 24 and 27 are closed, as shown by step 9 of the sequence chart, the voltage across the primary winding 14 of the auxiliary transformer 7 is zero and, therefore, the secondary windings 15 and 16 of the auxiliary transformer 7 no longer substantially affect the voltage of the motor 1. Steps 9ª and 9ᵇ of the sequence chart are the transition positions, as they are the steps necessary in changing the connections of the secondary windings 15 and 16 of the auxiliary transformer 7 so that they no longer oppose the voltage across the motor 1 but add thereto.

This change is effected by first closing the switch 21, thereby directly connecting the motor 1 across the taps 11 and 43 of the secondary winding 9 of the main transformer 6. The switches 36 and 41 are closed and the switches 39 and 33 are opened.

The switch 21 is then opened and a circuit for energizing the motor 1 is established from tap 11 of the secondary winding 9 of the main transformer 1 through switch 36, the parallel-connected secondary windings 15 and 16 of the auxiliary transformer 7, switches 31, 32 and 41, and series field-magnet winding 3 and armature 2 of the motor 1 to tap 43 of the secondary winding 9 of the main transformer 6.

The voltage across the terminals of the motor 1 is increased by operating the switches 20 and 24 to 30, inclusive, in the reverse order to that employed for reducing the voltage across the primary winding 14 of the auxiliary transformer 7 to zero.

The order of closure of the switches 20 and 24 to 30, inclusive, is set forth by steps 10 to 17, inclusive, of the sequence chart. At steps 17, switches 29, 26, 30, 20, 36, 41, 31 and 32 are closed, thereby establishing a voltage across the motor 1 which is equal to the voltage across a point midway between the taps 11 and 12 of the secondary winding 9 of the main transformer 6 and the outer terminal 43 of the secondary winding 9.

Steps 17$^a$ and 17$^b$ are transition steps during which the connections of the motor 1 are transferred from the tap 11 to the tap 12 and, at the same time, the direction of the current induced by the energization of the primary winding 14 of the auxiliary transformer 7 in the secondary windings 15 and 16 of the auxiliary transformer 7 is reversed.

When the controller (not shown) is actuated through steps 17$^a$ and 17$^b$, the transition is accomplished by first closing the contactors 34 and 39, thereby connecting the secondary winding 15 of the auxiliary transformer 7 to tap 12 of the secondary winding of the main transformer 6 and to the series field-magnet winding 3 of the motor 1. Contactors 31 and 32 are opened simultaneously with the closure of contactors 34 and 39. The motor 1 is then connected in series relation with the taps 11 and 12 by secondary windings 16 and 15, respectively.

The primary winding 14 of the auxiliary transformer 7 tends to induce a current in the secondary winding 15 of the auxiliary transformer 7 that opposes the current traversing the secondary winding 15 and assists the current traversing the secondary winding 16 of the auxiliary transformer 7.

Switches 36 and 41 are then opened, thereby disconnecting the motor 1 from the tap 11, while switches 31 and 32 are closed, thereby again connecting the secondary windings 15 and 16 in parallel relation, the one to the other, each of them being in series relation with the tap 12 of the secondary winding 9 of the main transformer 6 and with the motor 1.

The voltage across the motor 1 is again increased by gradually reducing the voltage of the primary winding 14 of the auxiliary transformer 7 in the same manner as was done during steps 1 to 9, inclusive. This sequence of operation will not be further described except to state that, at step 41, the motor is directly connected to the tap 13 of the secondary winding 9 of the main transformer 6 by contactor 23, at which time the voltage across the terminals of the motor 1 is equal to the difference in potential between the taps 13 and 43 of the secondary winding 9 of the main transformer 6.

The voltage at which the motor 1 is operating is further increased by connecting the secondary windings 15 and 16 of the auxiliary transformer 7 to the tap 13 by means of contactor 38 and increasing the voltage of the primary winding 14 of the motor 7 from zero value to a maximum value. This maximum value is obtained when the primary winding 14 of the auxiliary transformer 7 is connected across the taps 11 to 13 by contactors 26 and 29, with contactors 20 and 30 closed.

The arrangement of the main circuits of the control system shown in Fig. 3 of the drawing is much the same as that of the control system shown in Fig. 1. However, the preventive coils 18 and 19 are not employed. Like switches and apparatus are given corresponding reference characters.

The method of employing the secondary windings 15 and 16 of the auxiliary transformer 7 to first oppose and then assist the voltage impressed upon the motor 1 is substantially the same as that employed in the system shown in Fig. 1. When, for example, the voltage across the primary winding 14 of the auxiliary transformer 7 has been reduced to zero, as, for instance, by steps 7 of the sequence chart shown in Fig. 4, switch 21 is closed, thereby making the voltage across the motor 1 equal to the difference in potential between the taps 41 and 11.

During the transition step 7$^a$, the terminals of the secondary windings 15 and 16 of the auxiliary transformer 7 are disconnected from the tap 11 by means of the contactor 33 opening and they are disconnected from the motor 1 by the contactor 39 assuming its open position. The secondary windings 15 and 16 of the auxiliary transformer 7 are connected to the tap 12 by means of the closure of the contactor 36 and are connected to the motor 1 by the closure of the contactor 41. At step 7$^b$, the contactor 21 is opened, breaking the direct connection of the motor 1 with tap 11 of the secondary winding 9 of the transformer 6.

The voltage of the motor 1 is then increased by gradually increasing the energization of the primary winding 14 of the auxiliary transformer 7, in accordance with steps 8 to 13, inclusive, of the sequence chart.

From the above description, it is apparent that we have provided a useful and novel method of employing preventive coils and an auxiliary transformer to effect step-by-step variation in the voltage applied to a motor, and that a great number of steps during acceleration of a motor may be effected by relatively few contactors or switches. Furthermore, the motor operation is effected without opening any circuit until after another circuit has been established that provides a path for the greater portion of the current. In this way, very little arcing occurs when the various accelerating switches are opened.

While we have shown our invention in a preferred form, it is apparent that minor modifications may be made in the arrangement of circuits and apparatus employed without departing from the spirit of our invention. We desire, therefore, to be limited only by the scope of the appended claims.

We claim as our invention:

1. In a control system, the combination with a translating device, of a main transformer having a plurality of taps, and an auxiliary transformer, means comprising a plurality of individual contactors and circuits for successively connecting said taps to said device to vary the voltage thereof, and means comprising a plurality of individual contactors and circuits for connecting said auxiliary transformer to said device and to said main transformer for more gradually varying the voltage thereof, said first and second means co-operating to prevent the interruption of any circuit while it is carrying a relatively large current.

2. The combination with a translating device, of a main transformer having a plurality of taps, an auxiliary transformer having a plurality of windings, means for connecting said taps successively to said device for varying the voltage derived from one of said transformer windings, and means for so connecting others of said auxiliary transformer windings to said device that said windings may be connected in parallel relation one to another during a portion of the accelerating period and during another portion of the accelerating period they may be connected to different taps of said main transformer.

3. The combination with a translating device, of a main transformer having a plurality of taps, means for successively connecting said taps to said device to vary the voltage thereof, an auxiliary transformer having a primary winding and a plurality of secondary windings, means for effecting step-by-step variation in the voltage of said primary winding, and means for so connecting said secondary windings to said device that said secondary windings successively tend to increase and decrease the energization of said device.

4. The combination with a translating device, of a main transformer having a plurality of taps, means for successively connecting said taps to said device to vary the voltage thereof, an auxiliary transformer having a primary winding and a plurality of secondary windings, means for effecting a step-by-step variation in the voltage of said primary winding, means comprising a plurality of switches for selectively connecting said secondary windings in series relation with said taps and said device, and means for connecting said secondary windings in parallel relation, the one to the other, said selective means and said parallel connecting means operating to maintain one of said windings in circuit with said device and one of said taps during the period of transition when the other secondary winding is being transferred from one of said taps to another.

5. The combination with a motor, of a main voltage-regulating device having a plurality of taps, means for directly connecting said taps to said motor, an auxiliary voltage-regulating device for co-operating with said main device for more gradually changing the voltage of said motor, means for connecting said auxiliary device to said taps to alternately oppose and assist said main device, and means for connecting portions of said auxiliary device in parallel relation, the one to the other, said parallel connecting means and the second-named means co-operating for connecting one of said portions of said second device to a different tap before disconnecting the other portion of said device from a preceding tap.

6. The combination with a voltage-regulating device having a plurality of taps, of a transformer provided with a winding, a preventive coil, means for connecting said winding to one of said taps and to said preventive coil, means for selectively connecting the terminals of said coil to said taps, and means for connecting portions of said coil in parallel relation.

7. The combination with a main transformer having a plurality of taps, of a second transformer having a winding, a preventive coil, means for connecting said winding to one of said transformer taps and to said coil, means for selectively connecting said coil to said taps, and means for connecting portions of said coil in parallel relation, said selectively connecting means and said parallel connecting means co-operating for effecting step-by-step variation in voltage of said second transformer winding.

8. The combination with a motor, of a main voltage-regulating device having a plurality of taps, an auxiliary voltage-regulating device, means for so connecting said auxiliary device to different taps of said main device that said auxiliary device alternately opposes and assists said main device to increase the energization of said motor and means for effecting a transition of said auxiliary device from one of said taps to another while maintaining the torque of said motor substantially constant.

9. The combination with a motor of a main, transformer having a plurality of taps, an auxiliary transformer, means for so connecting said auxiliary transformer to different taps of said main transformer that it alternately opposes and assists said main transformer to increase the energization of said motor and means for effecting a transition of said auxiliary transformer from one of said main transformer taps to another while maintaining the tractive effort of said motor substantially constant.

10. The combination with a motor, of a main transformer having a plurality of taps, an auxiliary transformer for increasing the number of accelerating steps for said motor, means for so connecting said auxiliary transformer to a tap of said main transformer that the voltage of said auxiliary transformer opposes the voltage of said main transformer, means for so connecting said auxiliary transformer to said tap of said main transformer that the voltage of said auxiliary transformer assists said main transformer and means for connecting said auxiliary transformer to another tap of said main transformer while maintaining the voltage of said motor substantially constant.

In testimony whereof, we have hereunto subscribed our names this 10th day of May, 1921.

CHARLES LE G. FORTESCUE.
LLOYD J. HIBBARD.